(12) United States Patent
Sorg et al.

(10) Patent No.: US 10,384,971 B2
(45) Date of Patent: Aug. 20, 2019

(54) REFINER AND GLASS MELTING PLANT (71) Applicant: Beteiligungen Sorg GmbH & Co. KG, Lohr am Main (DE)

(72) Inventors: Alexander Sorg, Aschaffenburg (DE); Matthias Lindig, Ingelheim (DE)

(73) Assignee: BETEILIGUNGEN SORG GMBH & CO. KG, Lohr am Main (DE)

( * ) Notice: Subject to any disclaimer, the term of this patent is extended or adjusted under 35 U.S.C. 154(b) by 333 days.

(21) Appl. No.: 15/173,968

(22) Filed: Jun. 6, 2016

(65) Prior Publication Data
US 2017/0253518 A1 Sep. 7, 2017

(51) Int. Cl.
C03B 5/20 (2006.01)
C03B 5/235 (2006.01)
C03B 5/182 (2006.01)
C03B 5/04 (2006.01)
C03B 5/185 (2006.01)
C03B 5/225 (2006.01)

(52) U.S. Cl.
CPC ............... C03B 5/182 (2013.01); C03B 5/04 (2013.01); C03B 5/185 (2013.01); C03B 5/225 (2013.01); C03B 5/2356 (2013.01)

(58) Field of Classification Search
CPC .............................. C03B 5/20; C03B 5/2353
USPC .................................... 65/135.1, 135.6, 347
See application file for complete search history.

(56) References Cited

U.S. PATENT DOCUMENTS

| | | | |
|---|---|---|---|
| 1,597,440 A * | 8/1926 | Ferngren | C03B 15/04 65/135.1 |
| 2,119,948 A | 6/1938 | Blau et al. | |
| 2,249,714 A | 7/1941 | McBurney | |
| 3,218,144 A | 11/1965 | Touvay | |
| 3,260,587 A | 7/1966 | Dolf et al. | |
| 3,532,483 A | 10/1970 | Cardot | |
| 3,606,825 A | 9/1971 | Johnson | |

(Continued)

FOREIGN PATENT DOCUMENTS

| | | |
|---|---|---|
| DE | 1218666 | 6/1966 |
| DE | 287244 | 2/1991 |
| EP | 1298094 | 4/2003 |

OTHER PUBLICATIONS

German Office Action, dated Oct. 19, 2016, priority document.
European Search Report, dated Jul. 5, 2017, priority document.

*Primary Examiner* — Cynthia Szewczyk
(74) *Attorney, Agent, or Firm* — Greer, Burns & Crain, Ltd.

(57) ABSTRACT

A glass melting plant refiner for thermal post-treatment of a glass melt containing bubbles, in particular for the production of fiberglass. To reduce the glass melt bubble content produced by submerged combustion burners, a refiner forms a glass melt tank, the glass melt flowing through the tank in a transport direction. The tank has a floor, side walls and a superstructure. A barrier, forming a raised floor part, runs essentially in the transport direction. The barrier forms, at each lateral side, a channel-shaped constriction with the side walls, a width of each constriction transverse to the transport direction being at most 0.45 times the tank width. At least one first fossil fuel heater heats the glass melt from above. At least one second electrical heating device, in each side wall and/or in the floor of the tank in the region of each constriction, extends into the glass melt.

19 Claims, 4 Drawing Sheets

(56) References Cited

U.S. PATENT DOCUMENTS

| | | | |
|---|---|---|---|
| 6,460,376 B1 * | 10/2002 | Jeanvoine | C03B 3/005 65/134.2 |
| 8,402,787 B2 | 3/2013 | Purnode et al. | |
| 2003/0066315 A1 | 4/2003 | Sakai et al. | |
| 2004/0224833 A1 | 11/2004 | Jeanvoine et al. | |
| 2009/0235695 A1 | 9/2009 | Pierrot et al. | |
| 2015/0197440 A1 | 7/2015 | Shock et al. | |
| 2015/0315057 A1 | 11/2015 | Charbonneau et al. | |

* cited by examiner

REFINER AND GLASS MELTING PLANT

CROSS-REFERENCES TO RELATED APPLICATIONS

This application claims the benefit of the German patent application No. 10 2016 103 755.9 filed on Feb. 3, 2016, the entire disclosures of which are incorporated herein by way of reference.

BACKGROUND OF THE INVENTION

The present invention relates to a glass melting plant, in particular for the production of fiberglass, having a melt crucible, raw materials being supplied to the melt crucible by a supply device, and melted there.

Glass melting plants can be heated by submerged combustion heaters. The advantage of such a glass melting plant is that a high melting performance is achieved in a small space.

Such a glass melting plant has already been described in U.S. Pat. No. 3,260,587. This glass melting plant has a melt chamber having submerged combustion heaters into which the raw material is delivered via a supply device. The submerged combustion heaters are situated completely within the liquid glass. Connected to the outlet of the melt chamber is a refiner segment, and a weir (raised part) extends over the entire width of the melt chamber in the area of the outlet.

In such melting plants having submerged combustion heaters, the problem frequently arises that the glass melt contains a high portion of gas bubbles. Here there is the theory that the bubble content arises from a reaction of the fossil fuel and the oxidant of the submerged combustion heater. The exothermic reaction of the two gaseous materials takes place inside the glass melt, and as reaction product from the fuel and the oxidant (as a rule, oxygen) there result carbon dioxide and water vapor. These reaction products form fine bubbles having a diameter of from 0.1 mm to 1 mm, and the bubbles reduce the quality of the glass melt. A gas portion in the glass melt of up to 30 vol. % has been reported.

In the use of conventional melting technology, depending on the product, the requirement with regard to bubble content is described by the measurement quantity number of bubbles per weight of the sample. Required quality levels of the glass product are between 0.1 bubble/1000 g glass and 100 bubbles/100 g glass. Frequently, the size of the bubbles also has to be within a specified range. In glass melting plants that are heated by submerged combustion heaters, such quality requirements often cannot be met. Therefore, this melting technology is frequently limited to the production of fiberglass, or glass and stone wool. These products are used for the production of insulating mats in which the bubble content of the fibers does not have a disadvantageous effect.

In order to make it possible to use the melting technology that is advantageous with regard to space requirements and melting performance for further applications as well, or to increase the quality of the produced glass, it is desirable to reduce the bubble content of the glass melt. For this purpose, in the glass melting plant known from U.S. Pat. No. 3,606,825, a refiner zone is provided in order to remove or release bubbles or other gaseous inclusions from the glass melt. The glass melting plant having submerged combustion heaters described in US 2004/0224833 A1 also has a refiner region connected to the glass melting tank. The glass melt heated by the submerged combustion heaters is, however, produced only in a side stream, and is supplied to the main stream glass melt, in particular, in the area of a feeder that is provided with mechanical homogenizing units for mixing the glass flowing out from the main stream and flowing together in the side stream.

In order to reduce the portion of foam or bubbles in the glass melt, US 2015/0197440 A1 proposes that, in a tank following the melt crucible, and having a floor, a roof, and a side wall structure that connects the floor and the roof, the glass melt permeated with the foam and bubbles be heated in order to maintain or raise the temperature of the glass melt and in addition to control the composition of the gas above the glass melt in the tank, e.g., its water saturation, and/or to agitate the surface of the glass melt using a liquid or solid composition, for example, using drops of water.

In US 2009/0235695 A1, in contrast, for the homogenization of the glass melt it is proposed to provide, in the glass melt tank above a submerged combustion heater, a burner situated in the superstructure whose flame in the region of the glass melt impinges on the surface of the melt, in which region the bubbles produced by the submerged combustion heater reach the surface of the glass melt.

A glass melting plant having a refining region for the reduction of the portion of bubbles is also described in U.S. Pat. No. 8,402,787 B2, where a movable refiner tank has at its input a shaft that is made such that the transfer of the molten glass to the refiner region takes place with a minimal loss of heat.

In US 2015/0315057, it is further proposed, for the removal of foam and bubbles from the glass melt, to use acoustic waves or particle radiation, for example, using compounds containing sulfur, glass shards, ground glass, particles having a composition that can be integrated into the molten glass, frozen $CO_2$, solid organic materials, or combinations or mixtures thereof. In addition, it is proposed to remove the foam or the bubbles through continuous or intermittent agitation with material woven in the manner of a sieve, or non-woven material.

The solutions described above are however complex and cost-intensive, or change the composition of the glass melt. In addition, the desired improvement of quality is frequently still not achieved.

SUMMARY OF THE INVENTION

An object of the present invention is therefore to provide a device that brings about an effective reduction of the bubble content of the glass melt using simple and low-cost means. In addition, the object is to indicate a corresponding low-cost method.

The object indicated above is achieved by a refiner. In particular, the refiner has a tank for accommodating the glass melt, which flows through the tank in a direction of transport between the front end and an outlet situated at the rear end, the tank having a floor, two side walls preferably extending parallel to the direction of transport, and a superstructure situated above the side walls and terminating the tank upwardly, a barrier running essentially in the direction of transport being situated on the floor of the tank in the form of a floor raised part, the barrier forming a channel-shaped constriction (narrowing) of the tank at least in a front region, in the direction of transport, at each side directly above the floor of the tank, the width of each constriction transverse to the direction of transport being at most 0.45 times the width of the tank, particularly preferably at most 0.4 times the width of the tank, at least one first fossil fuel heating device being provided that is situated in the superstructure and/or in the side wall and that heats the glass melt from above, and at least one second electrical heating device being situated in each side wall and/or in the floor of the tank in the region of each constriction, which heating device extends into the glass melt and also heats it. Here, the refiner is formed as a further vessel connected directly to the outlet of the melt crucible, in which at least one submerged combustion heater heats the initial materials in order to bring them to the melting point.

The present invention is based on the recognition that the bubble content of the glass melt can be reduced by increasing the buoyancy of the bubbles. The bubbles can be brought to the surface of the glass melt solely through their buoyancy. Stokes' Law describes the relation between the viscosity of the glass melt, the difference in density between the glass melt and the gas bubbles, and the radius of the gas bubbles. Because the gas melt has a high viscosity, the speed of the rise of the gas bubbles is low. As a result, for the thermal post-treatment of a glass melt containing bubbles a second vessel (refiner) is required through which the glass melt is guided. The size of the second vessel (refiner), and thus the dwell time of the glass melt in this vessel, as well as the temperature control or heating, determine the extent to which the bubble content of the glass melt can be reduced.

Moreover, an extensive modeling study has shown that fossil fuel heating alone is not suitable to cause a sufficient number of the bubbles to rise. Only a barrier situated in the flow, which brings about a division and constriction of the flow, together with the additional electrical heating, results in a significant strengthening of the buoyancy, and correspondingly to a significant reduction in the bubble content. According to the present invention, the combination of the barrier extending in the direction of transport with the first, fossil fuel heating device, that supplies heat from above and the second, electrical heating device, that directly heats the glass melt, brings about a significant reduction of the number of bubbles in the glass melt. The buoyancy of the bubbles is promoted by the heating from all sides, because this reduces the viscosity of the glass melt. The barrier forming the channel-shaped constrictions brings about a division of the flow of the glass melt. The main flow paths here run along the barrier at the side thereof inside the channel-shaped constrictions with an increased flow speed that also promotes the buoyancy of the gas-filled bubbles. Inside the constriction, the glass melt has a height that corresponds to the height of the glass melt before the barrier. Above the barrier, the height of the glass melt is lower, corresponding to the height of the barrier.

In a preferred exemplary embodiment, length l1 of each constriction is from 0.2 to 0.8 times the length L1 of the tank of the refiner, and/or the width b1 of each constriction is at least 0.1 times the width W1 of the tank of the refiner, particularly preferably at least 0.2 times the width W1 of the tank of the refiner, and/or the height h1 of the barrier is from 0.2 to 0.8 times the height H1 of the melt surface in the refiner over the floor of the tank. A barrier having such dimensions particularly effectively removes the bubbles present in the glass melt and brings about an adequately large throughput of the refiner.

Here it is to be explicitly noted that the barrier does not extend over the entire width of the tank, at least in the region of the channel-shaped constrictions. For example, the channel-shaped constriction is limited laterally on the one hand by the side wall of the barrier and on the other hand by the side wall of the tank. In the existing art, up to now only raised parts have been described that raise the glass melt over the entire width of the tank, so that the glass melt has a shallower depth over its entire width transverse to the direction of transport. The design of the barrier according to the present invention, in contrast, brings about a division and acceleration of the glass flow in order to promote the rise of the bubbles.

In a development of the present invention, the at least one first fossil fuel heating device is situated in the superstructure and/or in the side wall in such a way that it heats the glass melt from above predominantly in a region that, in the direction of transport, is situated before, next to, and/or over the constriction formed by the barrier. Through such a heating, a reduction of viscosity is achieved, in particular, in the crucial region for the reduction of the bubble content.

It is further advantageous if, in the region of each constriction, there are situated at least two second heating devices in the side wall and/or in the floor of the tank, preferably each lateral to the barrier. This achieves a still better heating of the refiner, so that the number of bubbles can be further reduced.

It is further advantageous if the shape of the barrier in cross-section is made symmetrical relative to a mid-axis of the tank that runs parallel to the direction of transport.

In a development of the present invention, an apex surface or an apex line of the barrier is situated below the melt surface of the glass melt, the apex line or apex surface preferably extending parallel or obliquely to the melt surface, and the apex surface or apex line particularly preferably climbing upward in the direction of transport. Here, the apex surface or apex line limits the barrier upwardly, i.e., at the side opposite the floor. An apex surface is formed if the barrier is shaped upwardly flat, comparable to a flat roof. An apex line results if the barrier forms at the top an edge running in the direction of transport, i.e., a shape comparable to a pitched or gabled roof, a hipped roof, or a mansard roof. In particular, given the realization of the barrier having an apex line, the flow of the glass melt can effectively be divided so that the bubble content can be further reduced. The rise of the bubbles is further promoted in that the apex surface or the apex line climbs upward in the direction of transport.

For the same reason, it is advantageous if the cross-section of the barrier transverse to the direction of transport is trapezoidal or triangular at least in some segments.

The barrier can have, in a front region or rear region in the direction of transport, a segment that runs to a point in the direction of the floor of the tank.

It is further advantageous if the width of the channel-shaped constriction:
  becomes smaller in the direction of transport, or
  remains constant in the direction of transport, or
  becomes smaller in a first region and remains constant in a second region, in the direction of transport, the second region preferably being situated behind the first region in the direction of transport.

In addition, the above object is achieved, with the advantages explained above, by a glass melting plant that has a melt crucible and a refiner as described above, the raw materials being supplied to the melt crucible by a supply device and melted there, and an outlet of the melt crucible situated opposite the supply device being connected to an inlet of the refiner preferably situated in the superstructure of the front end of the refiner. The raw materials can also contain glass shards. The glass melting plant according to the present invention preferably additionally has a conditioning channel connected to the refiner in the direction of transport and a feeder channel situated behind the conditioning channel.

With regard to the constructive size and the melt performance, it is advantageous if at least one submerged combustion heater, which heats the material, is situated in the melt crucible.

The above object is also achieved, with the same advantages, by a method for thermal post-treatment of a glass melt containing bubbles, the glass melt being situated in a tank, the glass melt flowing through the tank in a direction of transport between a front end and an outlet situated at the rear end, the tank having a floor, two side walls extending preferably parallel to the direction of transport, and a superstructure situated above the side walls that terminates the tank upwardly, the glass melt being guided over a barrier, in the form of a raised part of the floor, that is situated on the floor of the tank and runs essentially in the direction of transport, the barrier forming, at least in a front region in the direction of transport, at each side directly above the floor of the tank, at least one channel-shaped constriction of the tank, the width of each constriction transverse to the direction of transport being at most 0.45 times the width of the tank, preferably at most 0.4 times the width of the tank, the glass melt being heated from above by at least one first fossil fuel heating device situated in the superstructure and/or in the side wall, and being directly heated by at least one second electrical heating device situated in each side wall and/or in the floor of the tank in the region of each constriction and extending into the glass melt.

BRIEF DESCRIPTION OF THE DRAWINGS

In the following, the present invention is explained in more detail on the basis of exemplary embodiments shown in the Figures. Here, all features described and/or shown graphically, in themselves or in any combination, form the subject matter of the present invention, independent of their summarization in the claims or the relations of dependency among the claims.

DETAILED DESCRIPTION OF THE PREFERRED EMBODIMENTS

The raw material mixture for the glass production, in particular for the production of fiberglass, is continuously fed to a melt crucible 2 in the region of an inlet 1. As a rule, this takes place above a melt surface 4, using a continuously operating supply device. Alternatively, the raw material mixture can also be supplied below the melt surface 4. The melt crucible 2 is generally equipped with a water cooling unit and is made with a double-walled construction. The melt crucible 2 further has in its floor submerged combustion heaters 5 that melt the supplied raw material mixture. The submerged combustion heaters 5 are supplied with a fossil fuel 6 and with an oxidant. The gaseous reaction products of the fuel 6 with the oxidant (usually oxygen) of these submerged combustion heaters 5 partly remain in a glass melt 20 as bubbles. In part, however, they already rise in the melt crucible 2 and escape via an exhaust gas flue 3 of the melt crucible 2. From an outlet opening 7 close to the floor of melt crucible 2, the glass melt 20 is supplied to a refiner 8.

Figure 1:
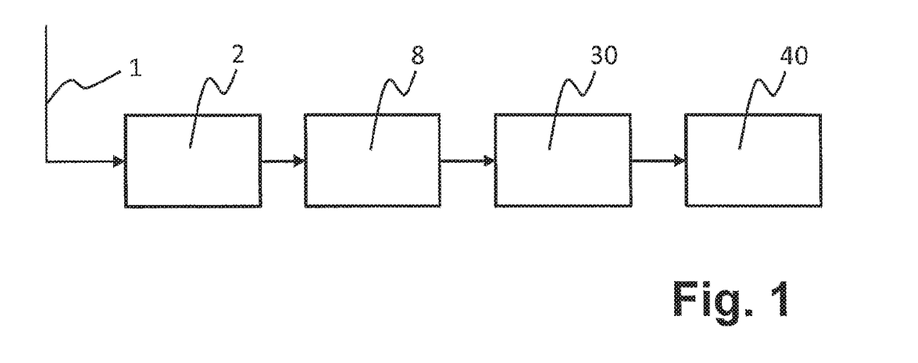
FIG. 1 schematically shows an exemplary embodiment of a glass melting plant according to the present invention, in the form of a flow schema, FIG. 2 schematically shows the melt crucible and the refiner of the glass melting plant according to FIG. 1, in a longitudinal section, FIG. 3 schematically shows details of the refiner shown in FIG. 2 in a further longitudinal section, FIGS. 4a and 4b schematically show the refiner according to FIG. 3 in further cross-sections along the line AB (see FIG. 3) or CD (FIG. 4a), FIGS. 5, 6a and 6b schematically show the representations according to FIGS. 3 and 4a, b with a marking that visualizes the movement of the bubbles in the melt, and FIGS. 7 and 8 schematically show further examples of barrier shapes and their configuration on the floor of the refiner, each in a perspective view from the side.
Figure 2:
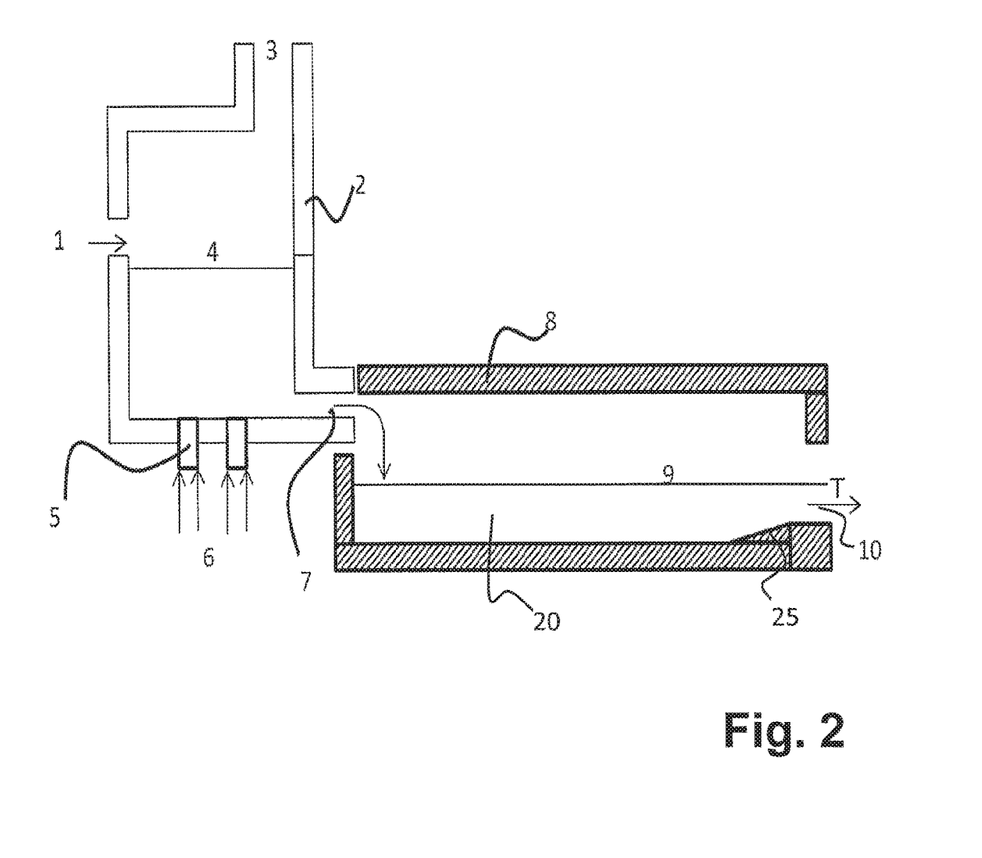

A supply opening 13 of the refiner 8 is situated at the front end of the refiner 8, in the region of a transport direction T (see arrow in FIGS. 2, 3, and 4a) of the glass melt 20. In the refiner 8, the gas bubbles contained in the glass melt rise to the surface. This is also referred to as refining. In the refiner 8 there arises a melt surface 9, and the glass melt leaves the refiner 8 at its rear end in direction of the transport direction T, through an outlet 10.

From the refiner 8, the glass melt now moves over a ramp 25, which provides a shape that promotes flow and is situated before the outlet 10, into a third vessel 30 in which the glass melt is cooled to a temperature required for processing. This process is also referred to as thermal conditioning. From the third vessel 30, the glass melt is then conducted into a fourth vessel 40 that is equipped with a heating system. In this fourth vessel 40, the glass melt is released in a controlled fashion from openings in the floor and is processed to form fibers. The fourth vessel is also referred to as the feeder channel. The openings from which the glass melt exits in order to produce the fibers are called bushings.

Figures 3, 4A, 4B:
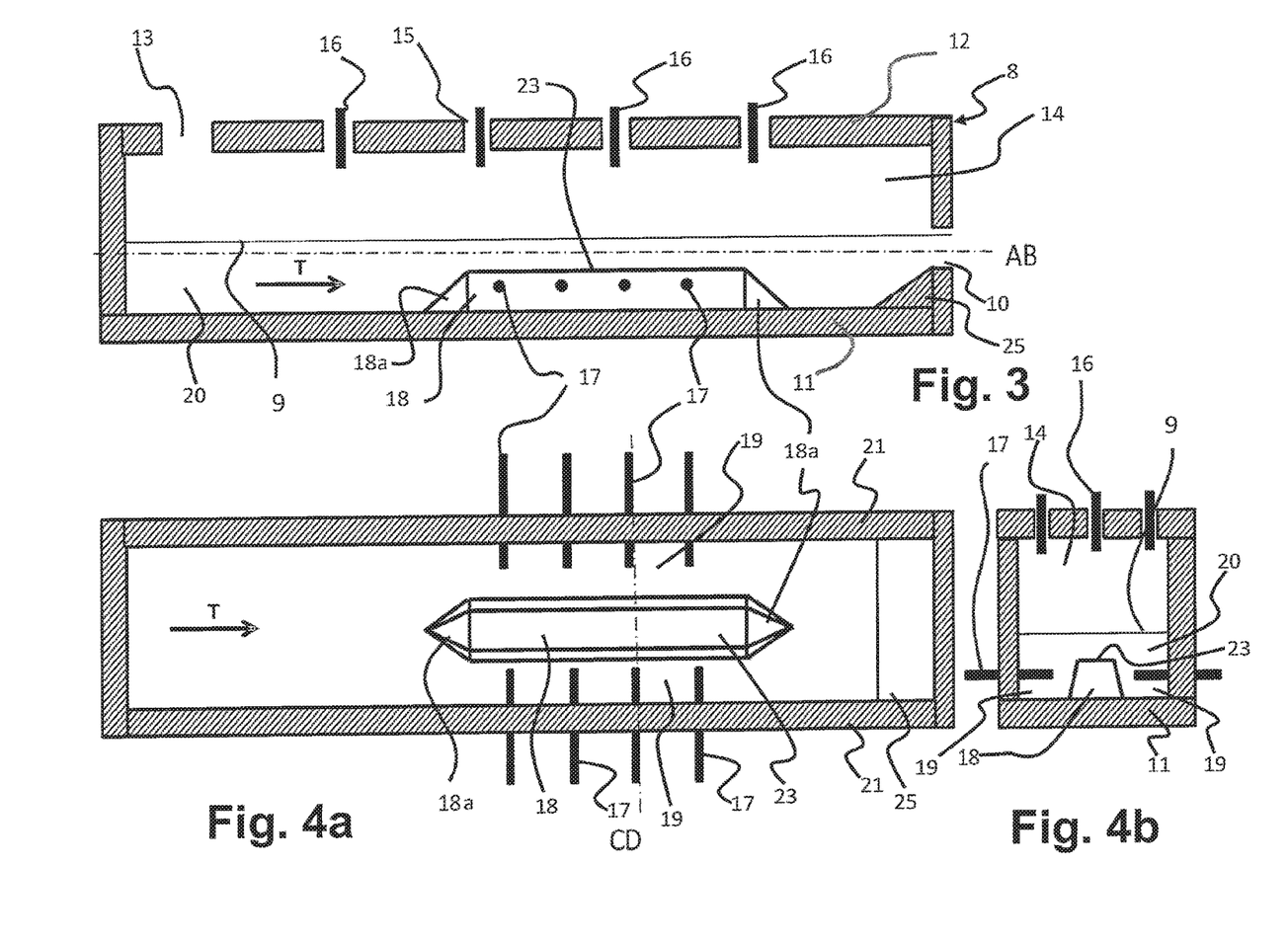

The refiner 8, shown in more detail in FIGS. 3, 4a, and 4b, has a tank for accommodating the glass melt 20 having a floor 11, side walls 21 running parallel to the direction of transport, and a superstructure 12 that upwardly terminates the tank. The superstructure 12 is situated above the side walls 21. In superstructure 12, at the front end of the tank, there is situated an opening 13 through which the glass melt moves from the melt vessel 2 into the refiner 8. The tank of the refiner has a length L1 and a width W1. The melt surface 9 has a height H1 over the floor 11 (cf. FIGS. 5 through 6b).

Downstream from the opening 13, in the superstructure 12 there are provided a multiplicity of openings 15 through which there extends, vertically or at an angle, a respective burner lance 16 as a fossil fuel heating device, into a space 14 over the glass melt 20. Each burner lance 16 is supplied with fossil fuel and an oxidant (usually oxygen). The fossil fuel burners 16 heat the glass melt 20 from above, in a region before (in the direction of transport T) and over a barrier 18 on the floor 11 of the tank.

Underneath the melt surface 9, through each side wall 21, four electrodes 17 extend into the glass melt 20. The electrodes are mounted laterally relative to the barrier 18, and directly heat the glass melt.

The barrier 18 is a raised part situated in the center of the tank, having an approximate distance D1 from the opening 13 in the direction of transport T. The barrier 18 has its longest dimension (length l1) in the direction of transport T. The barrier 18 has a distance b1 from each side wall 21. Together with each side wall 21, the barrier 18 forms a respective channel-shaped constriction 19 having a width b1, which forces the flow of the glass melt 20 to divide into partial streams that move along the constriction 19. Within the constriction 19, the glass melt 20 has a height H1 that corresponds to the height H1 of the glass melt 20 in front of the barrier 18. Above the barrier 18, a height H2 of the glass melt is lower, corresponding to a height h1 of barrier 18.

In cross-section, the barrier 18 has a trapezoidal shape over the greater part of its length (see FIG. 4b), the upper side of the trapezoid forming an apex surface 23 over the length of the barrier 18. The apex surface 23 runs parallel to the melt surface 9. In addition, electrodes 17 are configured such that their mid-axis runs parallel to the apex surface 23 and has a distance from the floor 11 of the refiner 8 that corresponds to the height h1 of the barrier 18. Only in the direction of transport T, at the beginning and at the end of the barrier 18, does the barrier have a ramp-type segment 18a that runs to a point in the direction of the floor 11, giving the barrier 18 a shape that better promotes flow.

Figure 5:
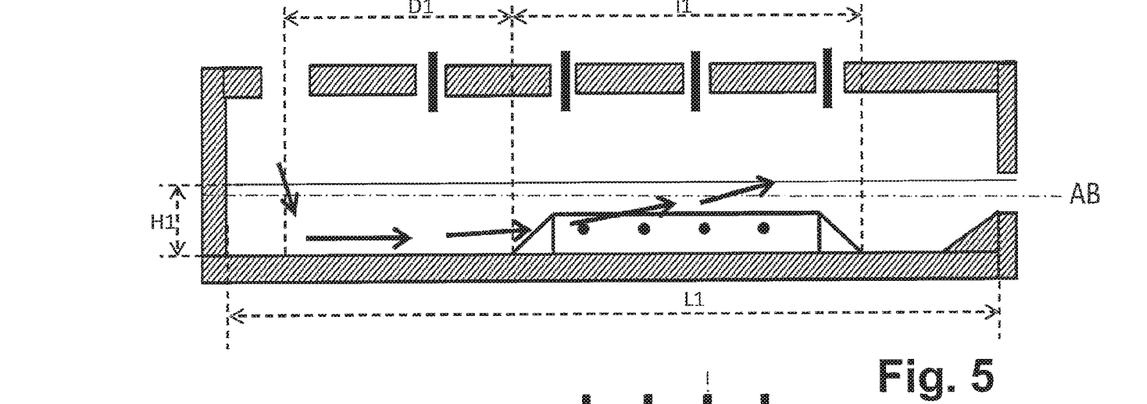
Figure 6A:
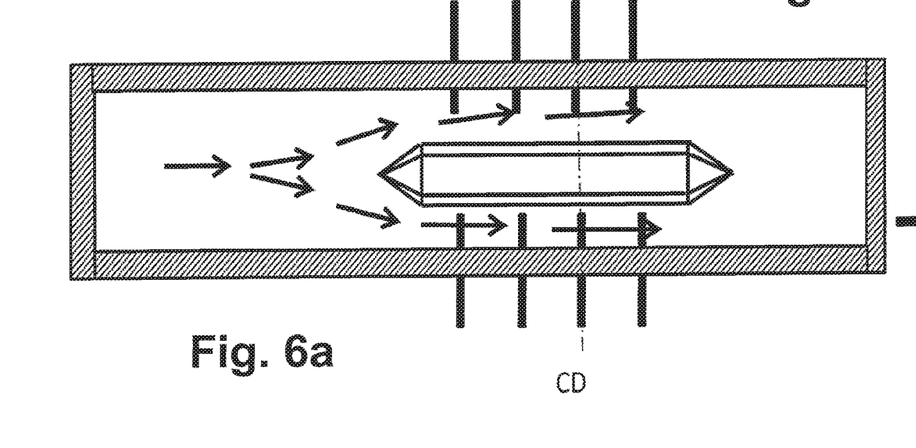
Figure 6B:
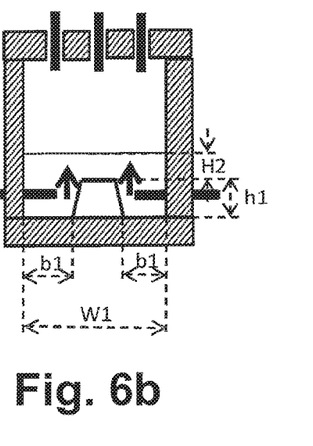

FIGS. 5 through 6b show, on the basis of the arrows in the glass melt 20, the path of the bubbles in the glass melt. Underneath the opening 13, the bubbles move in the direction of the floor 11. Before the barrier 18, the flow of the glass melt 20 is divided, by the centrically situated barrier 18, into two partial streams that each move along the channel-shaped constrictions 19 and, in these, rise to the surface of the glass melt 20.

A model example, having a barrier analogous to the barrier 18 shown in FIGS. 3 through 6b:

In a model, it was calculated that in the production of fiberglass (c-glass) in a glass melting plant having a through-put performance of 250 metric tons/day, the quantity of bubbles in the glass melt 20 transferred from the melt crucible 20 to the refiner 8 has a volume percent portion of 25%. The refiner 8 has a length L1 of 8900 mm, a width W1 of 2000 mm, and a height of the melt surface 9 over the floor 11 of 575 mm. The barrier 18 begins at a distance D1 of 3750 mm from the point of transfer of the glass melt from the melt crucible 2, the barrier being situated on the floor 11 of the refiner 8. The barrier 18 has a length l1 of 2600 mm and a height h1 of 200 mm. The width of the barrier 18 is 650 mm. Consequently, a distance b1 of the barrier from each side wall 21, i.e., the width of the constriction 19, is approximately 675 mm.

To the left and to the right of the barrier 18, in each case four electrodes 17, situated inside the wall 21, extend into the glass melt 20. The apex surface 23 of the barrier 18 is at the same height as the mid-axes of the electrodes 17; i.e., the electrodes extend into the glass melt 20 at a height of 200 mm over the floor 11. In the superstructure 12 of the refiner 8, there are situated four rows of three burner lances 16 each, oriented at an angle of 20° relative to the transport direction T of the glass melt 20.

The electrical power introduced via the electrodes 17 is a total of 200 kW. The heating power of the burner lances 16 is a total of about 300 kW. Upon its entry into the refiner 8, the glass melt 20 has a temperature of about 1230° C. In the refiner 8, the glass melt is heated to a temperature of about 1280° C. According to the model calculation, the number of bubbles along the refiner 8 is reduced to half through the combination of the measures described above.

The table below provides, in addition to the model example explained above (designated as a case study in the table), further examples of glass melting plants where the barrier (raised part) 18 has, in each case, the shape shown in FIGS. 3 through 6b. Three different "regions" are distinguished, namely a region I having a daily throughput of between 80 t and 300 t, a region II having a daily throughput of between 200 t and 250 t, a region III having a daily throughput of between 150 t and 200 t.

[note: t=metric tons]

For the model example and the regions I through III, the table indicates the inner dimensions of the refiner and the measurements of the barrier (raised part) 18.

| Refiner dimension | Unit | Case study | Region I | Region II | Region III |
| --- | --- | --- | --- | --- | --- |
| Throughput | t/d | 250 | 80-300 | 200-250 | 150-200 |
| Length | L1 m | 8.9 | 4-15 | 5-12 | 4-10 |
| Width | W1 m | 2 | 1-3 | 1-3 | 1-3 |
| Depth | H1 m | 0.575 | 0.3-0.8 | 0.3-0.8 | 0.3-0.8 |
| Barrier |  |  |  |  |  |
| Length | l1 m | 2.6 | 0.2-0.8 × L1 | 0.3-0.6 × L1 | 0.3-0.6 × L1 |
| Width | w1 m | 1 | 0.2-0.8 × W1 | 0.3-0.6 × W1 | 0.3-0.6 × W1 |
| Depth | h1 m | 0.35 | 0.2-0.8 × H1 | 0.3-0.6 × H1 | 0.3-0.6 × H1 |
| Width of constriction | b1 m | 0.5 | 0.1-0.45 × W1 | 0.15-0.4 × W1 | 0.2-0.4 × W1 |
| Specific load | t/m2d | 14.0 | 8-20 | 10-16 | 10-16 |

Figure 7:
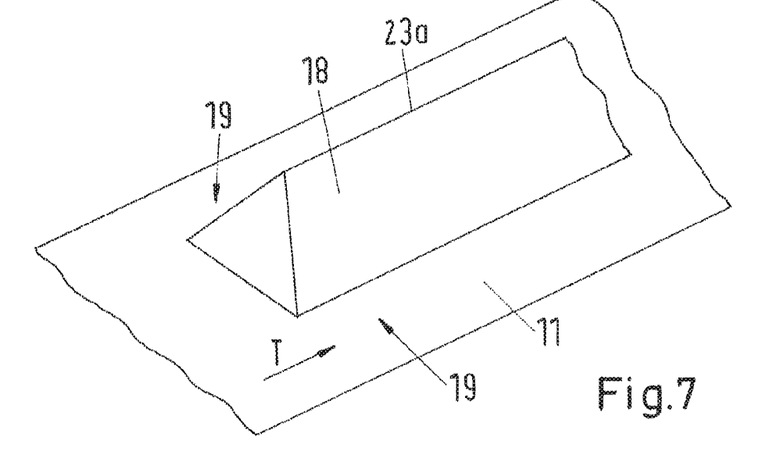
Figure 8:
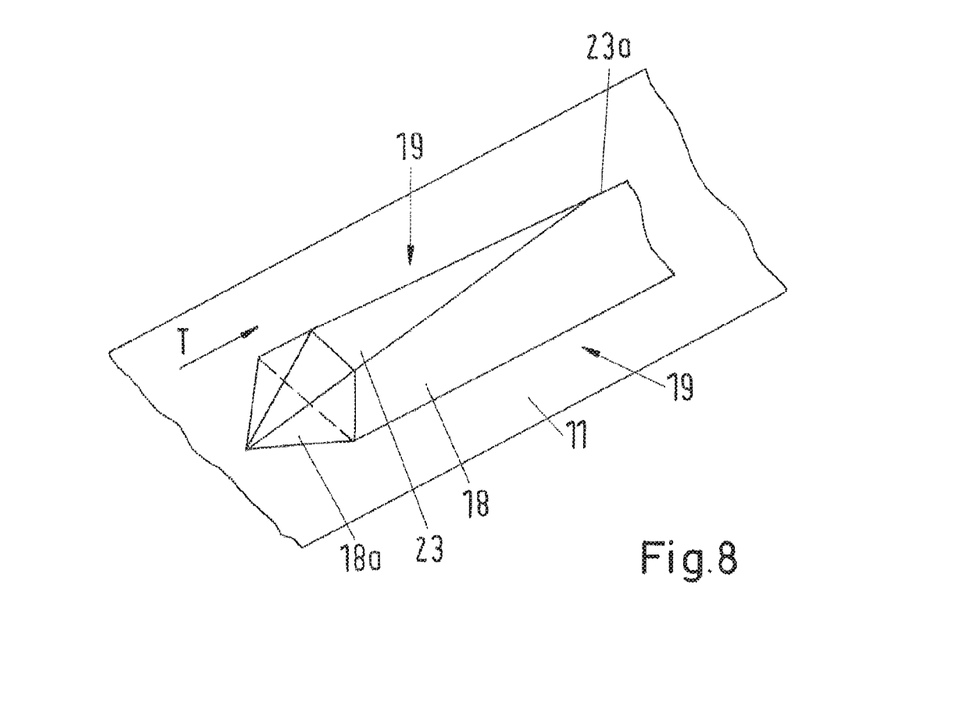

FIGS. 7 and 8 show further variant shapes of the barrier 18. The barrier 18 shown in FIG. 7 has a triangular cross-sectional shape and forms on its upper side an apex line 23a that runs parallel to the melt surface 9 (not shown). In addition, the barrier shown in FIG. 7, compared to the barrier shown in FIGS. 3 through 6b, does not have the beginning and end segment 18a running to a point.

In contrast, such a beginning segment, and possibly also end segment, 18a is provided in the barrier shown in FIG. 8.

The barrier 18 shown in FIG. 8 has at its beginning a trapezoidal cross-section. In the direction of transport T, the apex surface 23 tapers in such a way that it finally forms only an apex line 23a, and the cross-sectional shape of the barrier 18 in this region forms a triangle. The apex surface 38 also climbs upward in the direction of transport T, so that the height h1 of the barrier increases in the direction of transport T.

All such barriers 18 bring about a significant reduction of the bubble content of the glass melt, and thus an improvement of the glass quality.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS 1 inlet
2 melt crucible
3 waste gas flue
5 submerged combustion burner
6 combustion gas
7 outlet opening
8 refiner
9 melt surface
10 outlet
11 floor
12 superstructure
13 opening
14 space above glass melt 20
15 opening
16 burner lance
17 electrode
18 barrier
18a segment
19 channel-shaped constriction
20 glass melt
21 side wall
23 apex surface
23a apex line
25 ramp
30 third vessel
40 fourth vessel
T direction of transport

The invention claimed is:

1. A refiner for a glass melting plant for the thermal post-treatment of a glass melt containing bubbles, comprising:
 a tank configured to accommodate the glass melt, the tank having a front end and an outlet at a rear end, with a direction of transport of the glass melt flowing through the tank extending from the front end to the rear end, the tank having a floor, two side walls extending substantially parallel to the direction of transport, and a superstructure situated above the side walls and upwardly terminating the tank,
 a barrier, in the form of a raised part of the floor, situated on the floor of the tank and running essentially in the direction of transport, the barrier forming with the side walls, at least in a front region in the direction of transport, at each lateral side of the barrier, a channel-shaped constriction of the tank, a width of each constriction transverse to the direction of transport being at most 0.45 times the width of the tank,
 at least one first fossil fuel heating device situated in at least one of the superstructure or the side wall, the first heating device configured to heat the glass melt from above, and
 at least one second electrical heating device situated in at least one of each side wall or in the floor of the tank in the region of each constriction, the second heating device extending into the glass melt and being configured to heat the glass melt.

2. The refiner as recited in claim 1, wherein the width of each constriction transverse to the direction of transport is at most 0.4 times the width of the tank.

3. The refiner as recited in claim 1, wherein a length of each constriction is from 0.2 to 0.8 times the length of the tank of the refiner.

4. The refiner as recited in claim 1, wherein the width of each constriction is at least 0.1 times the width of the tank of the refiner.

5. The refiner as recited in claim 1, wherein the width of each constriction is at least 0.2 times the width of the tank of the refiner.

6. The refiner as recited in claim 1, wherein a height of the barrier is from 0.2 to 0.8 times the height of the melt surface in the refiner over the floor of the tank.

7. The refiner as recited in claim 1, wherein the at least one first heating device is situated in at least one of the superstructure or in the side wall in such a way that it heats the glass melt from above predominantly in a region that is situated, in the direction of transport, at least one of before, next to, or above the constriction formed by the barrier.

8. The refiner as recited in claim 1, wherein in the region of each constriction there are situated at least two second heating devices in at least one of the side wall or the floor of the tank.

9. The refiner as recited in claim 1, wherein a shape of the barrier in cross-section is symmetrical to a mid-axis of the tank running parallel to the direction of transport.

10. The refiner as recited in claim 1, wherein one of an apex surface or an apex line of the barrier is situated underneath the melt surface of the glass melt, the one of the apex line or the apex surface extending parallel to the melt surface.

11. The refiner as recited in claim 1, wherein one of an apex surface or an apex line of the barrier is situated underneath the melt surface of the glass melt, the one of the apex line or the apex surface extending obliquely to the melt surface.

12. The refiner as recited in claim 11, wherein the one of the apex surface or the apex line angles upward in the direction of transport.

13. The refiner as recited in claim 1, wherein the cross-section of the barrier transverse to the direction of transport is one of trapezoidal or triangular at least in some segments.

14. The refiner as recited in claim 1, wherein, in the direction of transport, the width of the channel-shaped constriction becomes smaller.

15. The refiner as recited in claim 1, wherein, in the direction of transport, the width of the channel-shaped constriction remains constant.

16. The refiner as recited in claim 1, wherein, in the direction of transport, the width of the channel-shaped constriction becomes smaller in a first region and remains constant in a second region.

17. A glass melting plant comprising:
 a melt crucible and
 a refiner comprising:
  a tank configured to accommodate the glass melt, the tank having a front end and an outlet at a rear end, with a direction of transport of the glass melt flowing through the tank extending from the front end to the rear end,
  the tank having a floor, two side walls extending substantially parallel to the direction of transport, and a superstructure situated above the side walls and upwardly terminating the tank,
  a barrier, in the form of a raised part of the floor, situated on the floor of the tank and running essentially in the direction of transport, the barrier forming with the side walls, at least in a front region in the direction of transport, at each lateral side of the barrier, a channel-shaped constriction of the tank, a width of each constriction transverse to the direction of transport being at most 0.45 times the width of the tank, at least one first fossil fuel heating device situated in at least one of the superstructure or the side wall, the first heating device configured to heat the glass melt from above, and at least one second electrical heating device situated in at least one of each side wall or in the floor of the tank in the region of each constriction, the second heating device extending into the glass melt and being configured to heat the glass melt, wherein raw materials are supplied to the melt crucible by a supply device and melted there, an outlet of the melt crucible situated opposite the supply device being connected to an inlet of the refiner situated in the superstructure at the front end of the refiner.

18. The glass melting plant as recited in claim 17, wherein in the melt crucible there is situated at least one submerged combustion heater that heats the material.

19. A method for the thermal post-treatment of a glass melt containing bubbles in a tank, the glass melt flowing through the tank in a direction of transport between a front end and an outlet situated at the rear end, the tank having a floor, two side walls extending substantially parallel to the direction of transport, and a superstructure situated above the side walls that terminates the tank upwardly, comprising the steps:

guiding the glass melt over a barrier, in the form of a raised part of the floor that is situated on the floor of the tank and runs essentially in the direction of transport, the barrier forming, at least in a front region in the direction of transport, at each side a channel-shaped constriction of the tank, a width of each constriction transverse to the direction of transport being at most 0.45 times a width of the tank, heating the glass melt from above by at least one of at least one first fossil fuel heating device situated in the superstructure or in the side wall, and directly heating the glass melt by at least one second electrical heating device situated in at least one of each side wall or in the floor of the tank in the region of each constriction and extending into the glass melt.

* * * * *